(12) United States Patent
Agrawal et al.

(10) Patent No.: US 9,813,382 B2
(45) Date of Patent: Nov. 7, 2017

(54) CRYPTOGRAPHIC BINDING OF MULTIPLE SECURED CONNECTIONS

(75) Inventors: Sunil Agrawal, Milpitas, CA (US); Andrei Sheretov, Campbell, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 3349 days.

(21) Appl. No.: 11/715,607

(22) Filed: Mar. 7, 2007

(65) Prior Publication Data
US 2014/0032902 A1    Jan. 30, 2014

(51) Int. Cl.
*H04L 12/58* (2006.01)
*H04L 29/06* (2006.01)
*G06F 21/41* (2013.01)
*H04L 29/08* (2006.01)

(52) U.S. Cl.
CPC .......... *H04L 63/0428* (2013.01); *G06F 21/41* (2013.01); *H04L 51/22* (2013.01); *H04L 63/0815* (2013.01); *H04L 67/02* (2013.01)

(58) Field of Classification Search
CPC .............................. H04L 63/0815; G06F 21/41
USPC .......................... 726/8, 18, 19; 709/228, 229
See application file for complete search history.

(56) References Cited

U.S. PATENT DOCUMENTS

| | | | | |
|---|---|---|---|---|
| 6,421,768 | B1* | 7/2002 | Purpura | 711/164 |
| 7,082,532 | B1* | 7/2006 | Vick et al. | 713/155 |
| 7,610,390 | B2* | 10/2009 | Yared et al. | 709/229 |
| 2003/0149781 | A1* | 8/2003 | Yared et al. | 709/229 |
| 2005/0204148 | A1* | 9/2005 | Mayo et al. | 713/185 |

OTHER PUBLICATIONS

Security Assertions Markup Language, Draft Version 0.7: Internet Citation May 14, 2001, XP-00215730 by Philip Hallan-Baker of VeriSign pp. 1-23.*

* cited by examiner

*Primary Examiner* — Ellen Tran
(74) *Attorney, Agent, or Firm* — Shook, Hardy & Bacon L.L.P.

(57) ABSTRACT

In some embodiments, a method includes establishing a secured connection between a client device and a subordinate web service of a single sign-on service for a user, using a shared cryptographic key in a cookie stored on the client device that was transmitted over a different secured connection by a master web service of the single sign-on service, as part of authentication of the user for the single sign-on service.

5 Claims, 5 Drawing Sheets

CRYPTOGRAPHIC BINDING OF MULTIPLE SECURED CONNECTIONS

TECHNICAL FIELD

The application relates generally to data communications, and, in an example embodiment, the application relates to secured network communications.

BACKGROUND

Typically, a user is required to enter a username and password to access protected data from various websites (such as a user's email from a website providing email).

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
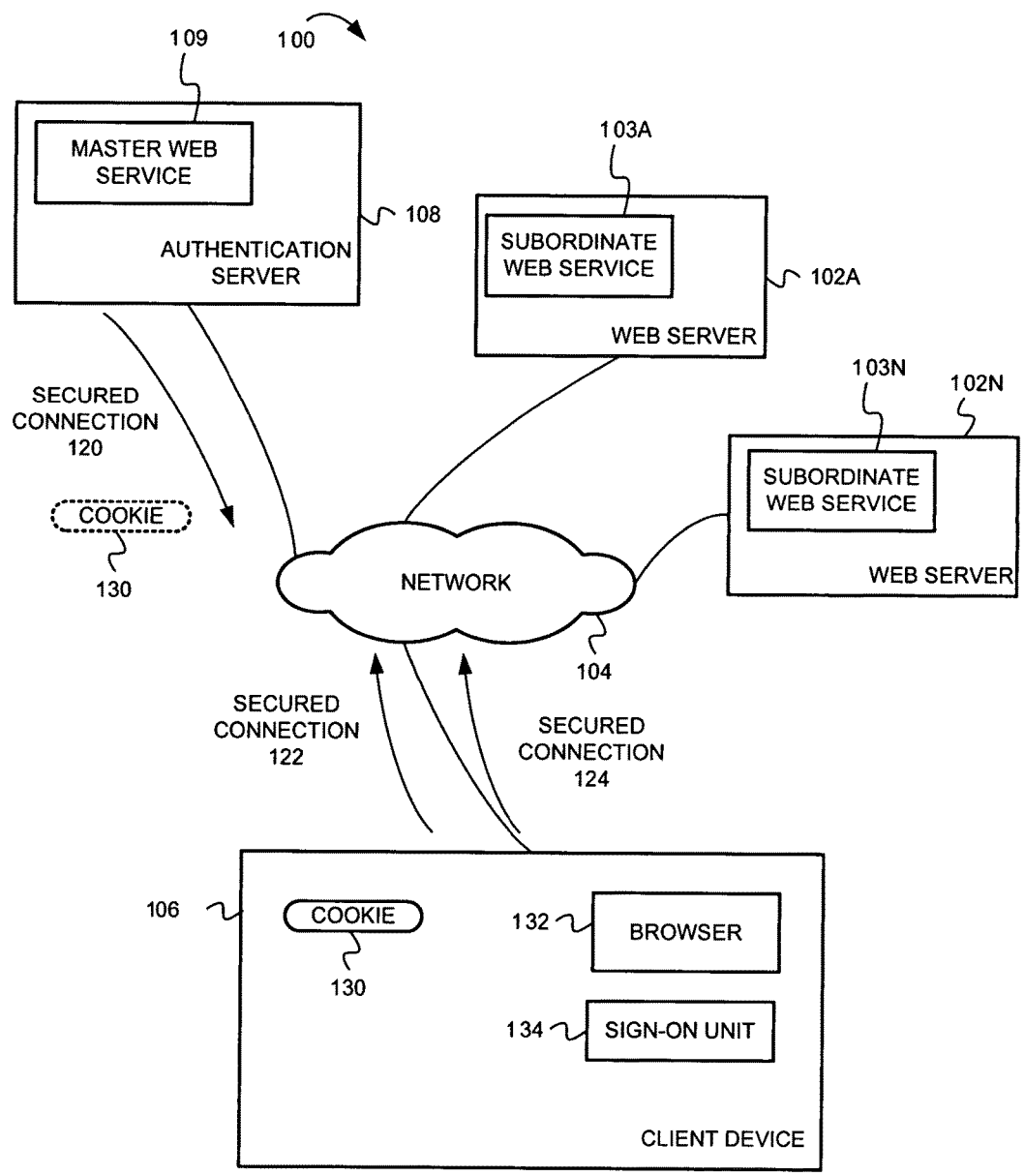
FIG. 1 is a network diagram of a system for cryptographic binding of multiple secured connections, according to some embodiments.

Methods, apparatus and systems for cryptographic binding of multiple secured connections are described. In the following description, numerous specific details are set forth. However, it is understood that embodiments of the invention may be practiced without these specific details. In other instances, well-known circuits, structures and techniques have not been shown in detail in order not to obscure the understanding of this description.

As used herein, the term "single sign-on service" refers to any type of authentication that allows a user to authenticate one time to enable access to resources of one or more software systems. The single sign-on service may be for one or more user names and one or more passwords. For example, a user may have a different user name and password for each software system, a same user name with different passwords for each software system, etc. While described relative to web-based applications, embodiments may include single sign-on service for any type of software systems. In some embodiments, sign-on to a software system in a single sign-on service may be routed to a trusted central authentication server for the sign-on operation. After successful authentication, a user may be returned to the software system.

As used herein, the term "cookie" refers to any type of data (used for authentication or tracking of a user) sent by a server to a web browser of the user executing on a client device. The cookie may then be sent back from the client device to the server, after the user subsequently attempts to access the server. Accordingly, cookies are used by a server to differentiate among users. The operations of the server may be dependent on the identification of the user.

As used herein, the term "master web service" refers to any type of authentication service for authenticating a user during the login of a user into a single sign-on service. The master web service may be hosted by any type of server coupled to a network (such as an authentication server, a web server, etc.).

As used herein, the term "subordinate web service" refers to any type of web service that is part of a single sign-on service. The subordinate web service may be any type of service that uses a single sign-on service for user authentication. Examples include email, messenger services, access to user-specific data (such as weather, radio, classifieds, etc.).

As used herein, the term "secured connection" refers to any type of secure communications between devices (such as servers, client devices, etc.) on a network. The secure communications may be based on any type of cryptographic protocol. Examples of secured connections include various versions of Secure Sockets Layer (SSL) (such as SSL 3.0), Transport Layer Security (TLS) (such as TLS 1.0), etc. An examples of the type of cryptography includes public key cryptography (such as Rivest, Shamir and Adleman (RSA), Diffie-Hellman, Digital Signature Algorithm (DSA), Fortezza, etc.). Another example of the type of cryptography includes symmetric ciphers (such as Rivest Cipher (RC)2, RC4, International Data Encryption Algorithm (IDEA), Data Encryption Standard (DES), Triple DES, AES, Camellia, etc. Another example of the type of cryptography includes one-way hash functions (such as Message Digest (MD)2, MD4, MD5, Secure Hash Algorithm (SHA), etc. The secured connection may include single or mutual authentication.

As used herein, the term "client device" refers to any type of device that may execute a software application. The client device may be a thin client, fat client, or a hybrid client. For example, client devices may include desktop computer, notebook computers, wireless/wired devices, mobile devices (such as cellular telephones, Personal Digital Assistants (PDAs)), media players (such as MP-3 devices), gaming consoles, set-top boxes, etc.

FIG. 1 is a network diagram of a system for cryptographic binding of multiple secured connections, according to some embodiments. A system 100 comprises a network 104 that couples together one to a number of web servers 102A-102N, client device 106 and an authentication server 108. In some embodiments, the authentication server 108 hosts a master web service 109. The web server 102A may host a subordinate web service 103A, and the web server 102N may host a subordinate web service 103N. The master web service 109 and the subordinate web services 103A-103N may be part of a single sign-on web service. In particular, the single sign-on service may include a suite of web services that may be accessed using a single authentication of a user. For example, a suite of web services may include email, messenger services, access to user-specific data (such as weather, radio, classifieds, etc.). While illustrated such that a different server is hosting the various web services, the servers may host the web services in any combination. For example, multiple or all such web services may be hosted on a single server.

The network communication may be any combination of wired and wireless communication. In some embodiments, the network communication may be based on one or more communication protocols (e.g., HyperText Transfer Protocol (HTTP), HTTP Secured (HTTPS), etc.). While the system 100 shown in FIG. 1 employs a client-server architecture, embodiments are not limited to such an architecture, and could equally well find application in a distributed, or peer-to-peer, architecture system.

The client device 106 includes a browser 132 and a sign-on unit 134. The browser 132, the sign-on unit 134, the master web service 109 and the subordinate web service 103A-103N may be software, hardware, firmware or a combination thereof for executing operations, according to some embodiments.

A secured connection 120 is established between the master web service 109 and the browser 132. A secured connection 122 is established between the browser 132 and the subordinate web service 103A. A secured connection 124 is also established between the browser 132 and the subordinate web service 103N. A cookie 130 is transmitted over the secured connection 120 from the authentication server 108 for storage in the client device 106. As further described below, data from the single cookie 130 is used to establish the multiple secured connections for the single sign-on service. Moreover, in some embodiments, only one public/private key data exchange is required to enable these multiple secured connections. In particular, a single public/private key data exchange may be performed for the master web service. Subsequent secured connections do not require such an exchange. Therefore, some embodiments allow for separate secured connections for any number of web services that are part of a single sign-on service, while not causing performance degradation associated with establishment of multiple secured connections. Further, in contrast to conventional techniques, the subordinate web services do not rely on cookies for session management. Rather, the communications between the subordinate web services and the client devices are based on secured connections. Therefore, communications, according to embodiments, may not vulnerable to cross site scripting (XSS) or session hijacking.

Figure 2:
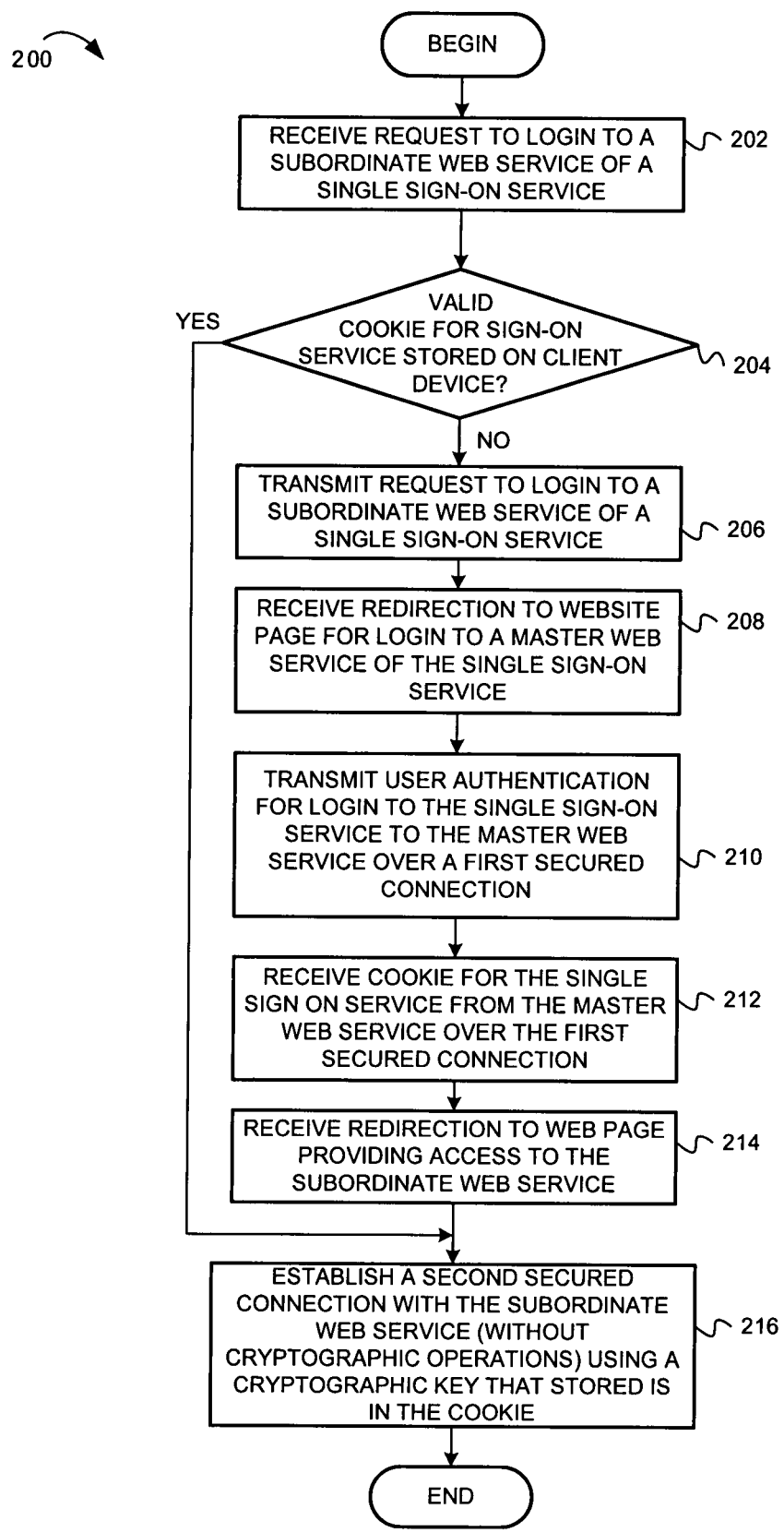
FIG. 2 is a flow diagram for operations by a user browser for cryptographic binding of multiple secured connections, according to some embodiments.

Operations, according to some embodiments, are now described. In certain embodiments, the operations are performed by instructions residing on machine-readable media (e.g., software), while in other embodiments, the methods are performed by hardware or other logic (e.g., digital logic). FIG. 2 is a flow diagram for operations by a user browser for cryptographic binding of multiple secured connections, according to some embodiments. The flow diagram 200 is described with reference to FIG. 1. In some embodiments, the flow diagram 200 is performed within the client device 106. The flow diagram 200 commences at block 202.

At block 202, a request to login to a subordinate web service of a single sign-on service is received. With reference to FIG. 1, the browser 132 may receive the request. In particular, the browser 132 may be directed to a login web page of the subordinate web service by a user. For example, the user may direct the browser 132 to the login page of an email service that is part of a single sign-on service. The flow continues at block 204.

At block 204, a determination is made of whether a valid cookie for the sign-on service is stored on the client device. With reference to FIG. 1, the sign-on unit 134 may make this determination. A cookie that includes a cryptographic key for secured communication may be stored on a machine-readable medium of the client device 106. For example, the cookie may have been stored in the client device 106 because the user has previous logged onto the single sign-on service. In some embodiments, the sign-on unit 134 may verify a timestamp of the cookie. For example, if the cookie has been stored in the client device 106 more than a given time period, the cookie is not considered valid. Therefore, a new cookie is retrieved from the master web service 109 (as further described below). Upon determining that the valid cookie is stored on the client device 106, the flow continues at block 214 (which is described in more detail below). Otherwise, the flow continues at block 206.

At block 206, a request to login to a subordinate web service of a single sign-on service is transmitted. With reference to FIG. 1, the browser 132 may forward requests for login web pages for a subordinate web service of a single sign-on service to the sign-on unit 134. The sign-on unit 134 may receive this request for this login web page. The sign-on unit 134 may transmit this request to the server hosting this subordinate web service 103. With reference to FIG. 1, the web server 102A may be hosting the subordinate web service 103. The flow continues at block 208.

At block 208, redirection to a website page for login to a master web service of the single sign-on service is received. With reference to FIG. 1, the sign-on unit 134 may receive this redirection from the subordinate web service 103 being hosted on the web server 102. The redirection may be to the master web service 109 being hosted on the authentication server 108. The flow continues at block 210.

At block 210, user authentication for login to the single sign-on service is transmitted to the master web service over a first secured connection. With reference to FIG. 1, the secured connection 120 (a first secured connection, such as SSL connection) may be established between the browser 132 and the master web service 109. The SSL connection may be established in accordance with Request For Comments (RFC) 2246—The Transport Layer Security (TLS) Protocol, which is hereby incorporated by reference. After establishment of the secured connection 120, user authentication may be transmitted to the master web service through the secured connection 120. For example, a user may be presented (through the browser 132) with a login page for the single sign-on service. The user may input the user authentication (such as username and password) into the page on the browser 132. The sign-on unit 134 may transmit the user authentication to the master web service 109 over the secured connection 120. The flow continues at block 212.

At block 212, a cookie for the single sign-on service is received from the master web service over the first secured connection. In particular, the master web service transmits the cookie after the user authentication has been authenticated. With reference to FIG. 1, the sign-on unit 134 may receive the cookie 130 over the first secured connection 120 from the master web service 109. The cookie 130 is shared by the different services of single sign-on service. For example, the cookie 130 may be shared by the master web service and the four different subordinate web services of the single sign-on service. In some embodiments, the cookie 130 may include an identification of a cryptographic key used for secured connections between the browser 132 and the different services of the single sign-on service. In some embodiments, the cookie 130 may also include the cryptographic key that is used to establish other secured connections between the browser 132 and the subordinate web services 103 of the single sign-on service. The cryptographic key may be symmetric. Accordingly, the secured communications between the subordinate web services 103 and the browser 132 are based on symmetric cryptography. The master web service 109 may communicate to the browser 132 that a particular type of secured connection needs to be established between the browser 132 and the subordinate web service 103. In particular, the secured connection between the browser 132 and the subordinate web service 103 may include the type of cryptographic operation to be used in the secured connection. The flow continues at block 214.

At block 214, redirection to a web page providing access to the subordinate web service is received. With reference to FIG. 1, the sign-on unit 134 receives redirection to a web page for the subordinate web service 103 (that the user attempted to originally login at block 202). For example, the web page may be the inbox page if the subordinate web service was for email. The flow continues at block 216.

At block 216, a second secured connection (for the single sign-on service) is established between the subordinate web service and the browser of the user using a cryptographic key that is stored in the cookie. With reference to FIG. 1, the sign-on unit 134 may perform this operation. In some embodiments, the cryptographic key is symmetric. The cryptographic key may be shared among the different services that are part of the single sign-on service. The browser 132 may establish the second secured connection based on the cryptographic key. In some embodiments, the second secured connection is established according to Request For Comments (RFC) 4279—Pre-Shared Key Ciphersuites for Transport Layer Security (TLS), which is hereby incorporated by reference, based on identification of the cryptographic key stored in the cookie 130. In some embodiments, the browser 132 transmits the identification of the cryptographic key to the subordinate web service 103. Accordingly, the subordinate web service 103 may retrieve the cryptographic key from a central repository (not shown). For example, the database may be stored in a separate server coupled to the network 104. In some embodiments, the cookie 130 that is stored in the client device 106 includes an encrypted version of the cryptographic key. The sign-on unit 134 may transmit this encrypted version of the cryptographic key to the subordinate web service 103. The subordinate web service 103 may then decrypt the cryptographic key. In some embodiments, the different web services of the single sign-on service share a cryptographic key that is used to decrypt the cryptographic key. Accordingly, the second secured connection is established for the single sign-on service. In particular, symmetric cryptographic key communication may be performed between the client device 106 and the subordinate web service 103. Such communication is based on a single cryptographic key that is stored in the cookie 130 received from the master web service 109. Moreover, this single cryptographic key may be used for secured connections for multiple subordinate web services 103. The operations of the flow diagram 200 are complete.

The operations of the flow diagram 200 may be performed for any number of subordinate web services. Therefore, a secured connection may be established for each of communications with the different subordinate web services based on a single cookie. Moreover, only one public/private key establishment may be needed for different secured connections with the different subordinate web services for the single sign-on service. Specifically, in some embodiments a public/private key exchange may be performed for the secured connection 120 between the master web service 109 and the browser 132. In some embodiments, communications between the browser 132 and the different subordinate web services 103 do not require a public/private key exchange. Rather, such communications are based on the cryptographic key stored in the cookie received by the master web service 109. Thus, the connections with the different subordinate web services are secure, and a performance hit is not taken for the establishment of such connections (due to public/private key exchanges).

Figure 3:
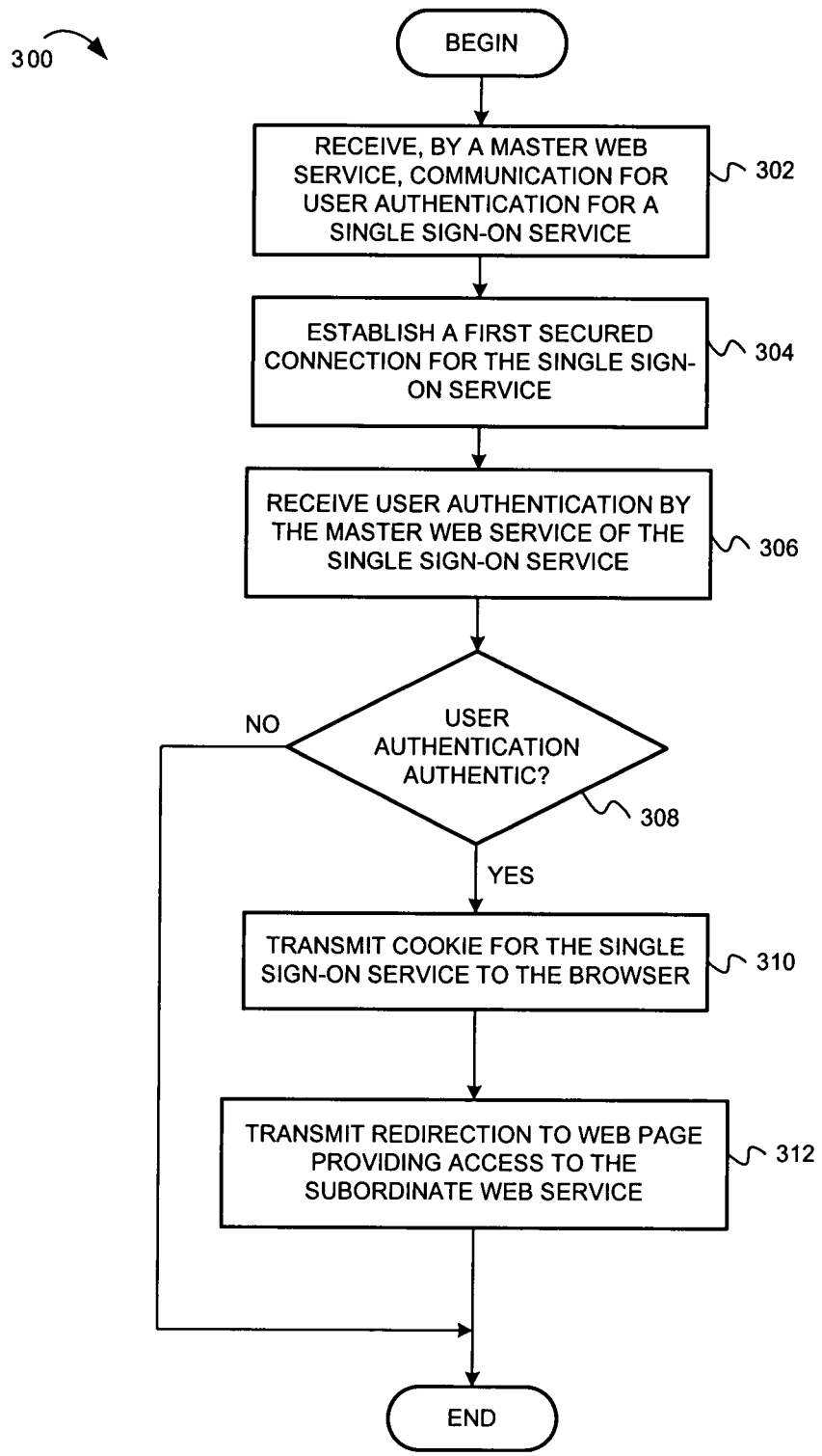
FIG. 3 is a flow diagram for operations by a master web service for cryptographic binding of multiple secured connections, according to some embodiments.

FIG. 3 is a flow diagram for operations by a master web service for cryptographic binding of multiple secured connections, according to some embodiments. The flow diagram 300 is described with reference to FIG. 1. In some embodiments, the flow diagram 300 is performed by the master web service 109 in the authentication server 108. The flow diagram 300 commences at block 302.

At block 302, communication regarding user authentication for a single sign-on service is received by a master web service. With reference to FIG. 1, the master web service 109 may receive this communication from the browser 132 executing on the client device 106. For example, the browser 132 may be redirected to the master web service, if the user attempts to login to a subordinate web service. The communication may involve the request to establish a secured connection for communication there between. The flow continues at block 304.

At block 304, a first secured connection is established for the single sign-on service. With reference to FIG. 1, the master web service 109 may established the first secured connection between the master web service 109 and the browser 132. In some embodiments, the first secured connection is an SSL connection. The first secured connection may include the use of asymmetric cryptographic operations. The flow continues at block 306.

At block 306, user authentication is received by the master web service of the single sign-on service. With reference to FIG. 1, the master web service 109 receives user authentication over the secured connection 120 from the browser 132. For example, a user may be presented (through the browser 132) with a login page for the single sign-on service. The user may input the user authentication (such as username and password) into the page on the browser 132. The sign-on unit 134 may transmit the user authentication to the master web service 109 over the secured connection 120. The flow continues at block 308.

At block 308, a determination is made of whether the user authentication is authentic. With reference to FIG. 1, the master web service 109 may make this determination. For example, the master web service 109 may verify that a username and password match based on data stored in a local or remote data repository. If the username and password match, the user authentication data is considered authentic. In response to a determination that the user authentication is not authentic, the operations of the flow diagram 300 are complete. The user is not able to access services of the single sign-on service. The master web service 109 may transmit an error message back to the browser 132 and consider this authentication operation complete. If the user authentication is authentic, the flow continues at block 310.

At block 310, a cookie for the single sign-on service is transmitted to the browser. With reference to FIG. 1, the master web service 109 may transmit the cookie 130 to the browser 132 over the first secured connection 120. The cookie 130 is shared by the different services of single sign-on service. For example, the cookie 130 may be shared by the master web service and the four different subordinate web services of the single sign-on service. In some embodiments, the cookie 130 may include an identification of a cryptographic key used for secured connections between the browser 132 and the different services of the single sign-on service. In some embodiments, the cookie 130 may also include a symmetric key that is used to establish other secured connections between the browser 132 and the subordinate web services 103 of the single sign-on service. The master web service 109 may communicate to the browser 132 that a particular type of secured connection needs to be established between the browser 132 and the subordinate web service 103. In particular, the secured connection between the browser 132 and the subordinate web service 103 may include the type of cryptographic operation are to be used in the secured connection. The flow continues at block 312.

At block 312, redirection instructions are transmitted to the browser to a web page providing access to the subordinate web service. With reference to FIG. 1, the master web service 109 may send this redirection over the first secured connection 120. For example, the web page may be the inbox page if the subordinate web service was for email. As described above, the browser 132 establishes a second secured connection with the subordinate web service using a cryptographic key that is stored in the cookie. The cryptographic key may be shared among the different services that are part of the single sign-on service. The browser 132 may establish the second secured connection based on the cryptographic key. The operations of the flow diagram 300 are complete.

Figure 4:
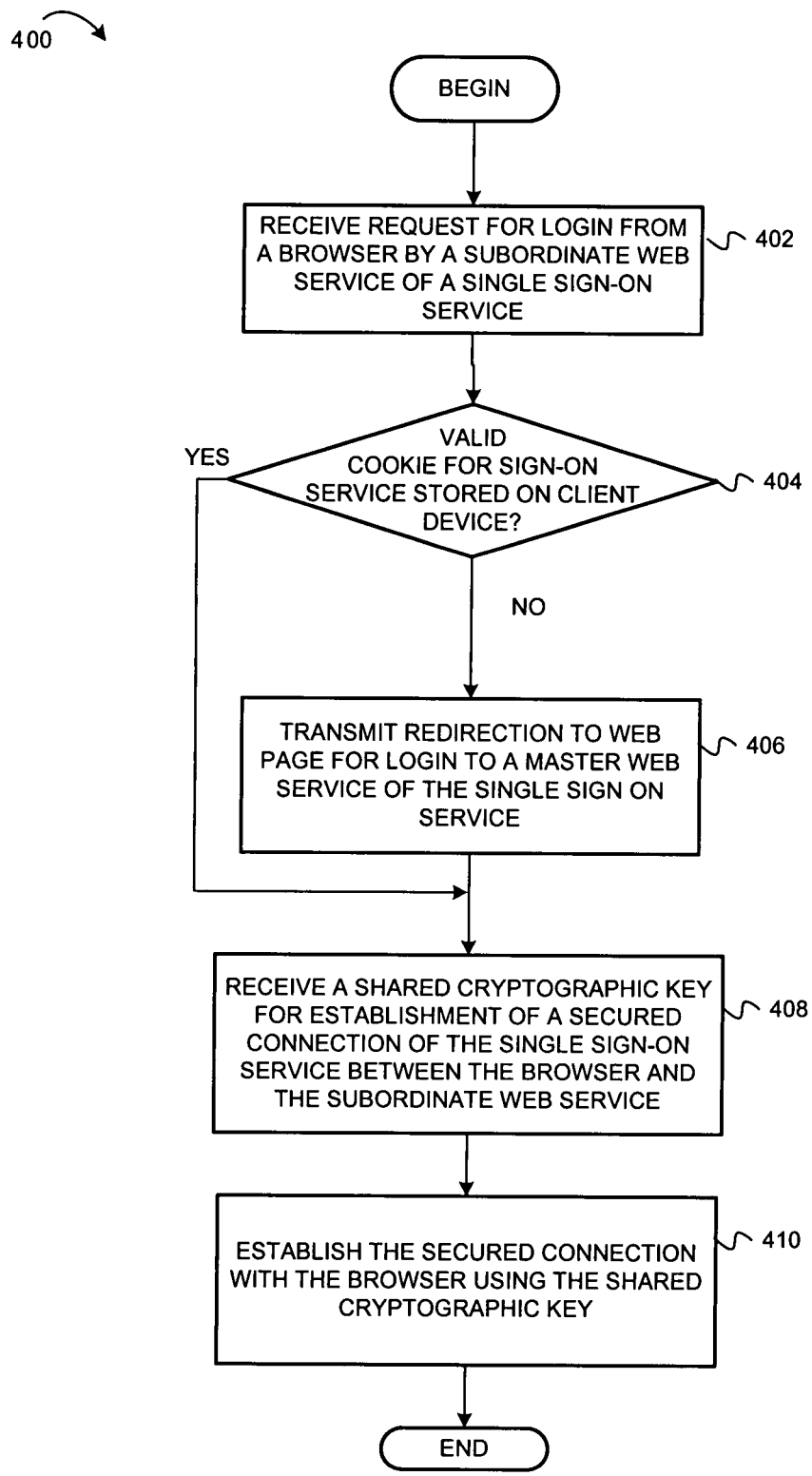
FIG. 4 is a flow diagram for operations by a subordinate web service for cryptographic binding of multiple secured connections, according to some embodiments.

FIG. 4 is a flow diagram for operations by a subordinate web service for cryptographic binding of multiple secured connections, according to some embodiments. The flow diagram 400 is described with reference to FIG. 1. In some embodiments, the flow diagram 400 is performed by the subordinate web service 103 in the web server 102. The flow diagram 400 commences at block 402.

At block 402, a request for login is received from a browser by a subordinate web service of a single sign-on service. With reference to FIG. 1, the subordinate web service 103 may receive this request from the browser 132. For example, the user may direct the browser 132 to the login page of an email service that is part of a single sign-on service. The flow continues at block 404.

At block 404, a determination is made of whether a valid cookie for the sign-on service is stored on the client device. With reference to FIG. 1, the subordinate web service 103 may query the browser 132 regarding whether a valid cookie is stored on the client device 106 (as described above). Upon determining that the valid cookie is stored on the client device 106, the flow continues at block 408 (which is described in more detail below). Otherwise, the flow continues at block 406.

At block 406, a redirection to a webpage for login to a master web service of the single sign-on service is transmitted to the browser. With reference to FIG. 1, the subordinate web service 103 may transmit redirection to the master web service 109 to the browser 132. The flow continues at block 408.

At block 408, a shared cryptographic key is received for establishment of a secured connection of the single sign-on service between the browser and the subordinate web service. With reference to FIG. 1, the subordinate web service 103 may perform this operation. The cryptographic key is shared for communication with the browser 132 and any of the subordinate web services 103. Accordingly, a same cryptographic key is used for secured connections with multiple subordinate web services 103. In some embodiments, the browser 132 transmits the identification of the cryptographic key to the subordinate web service 103. Accordingly, the subordinate web service 103 may retrieve the cryptographic key from a central repository (not shown). For example, the database may be stored in a separate server coupled to the network 104. In some embodiments, the cookie 130 that is stored in the client device 106 includes an encrypted version of the cryptographic key. The sign-on unit 134 may transmit this encrypted version of the cryptographic key to the subordinate web service 103. The subordinate web service 103 may then decrypt the cryptographic key. In some embodiments, the different web services of the single sign-on service share a cryptographic key that is used to decrypt the cryptographic key. The flow continues at block 410.

At block 410, the secured connection with the browser is established using the shared cryptographic key. With reference to FIG. 1, the subordinate web service 103 may establish the secured connection 124 with the browser 132. In some embodiments, the second secured connection is established according to Request For Comments (RFC) 4279—Pre-Shared Key Ciphersuites for Transport Layer Security (TLS). Accordingly, secured data communications may be made between the subordinate web service 103 and the browser 132 through the secured connection 124. The operations of the flow diagram 400 are complete.

Figure 5:
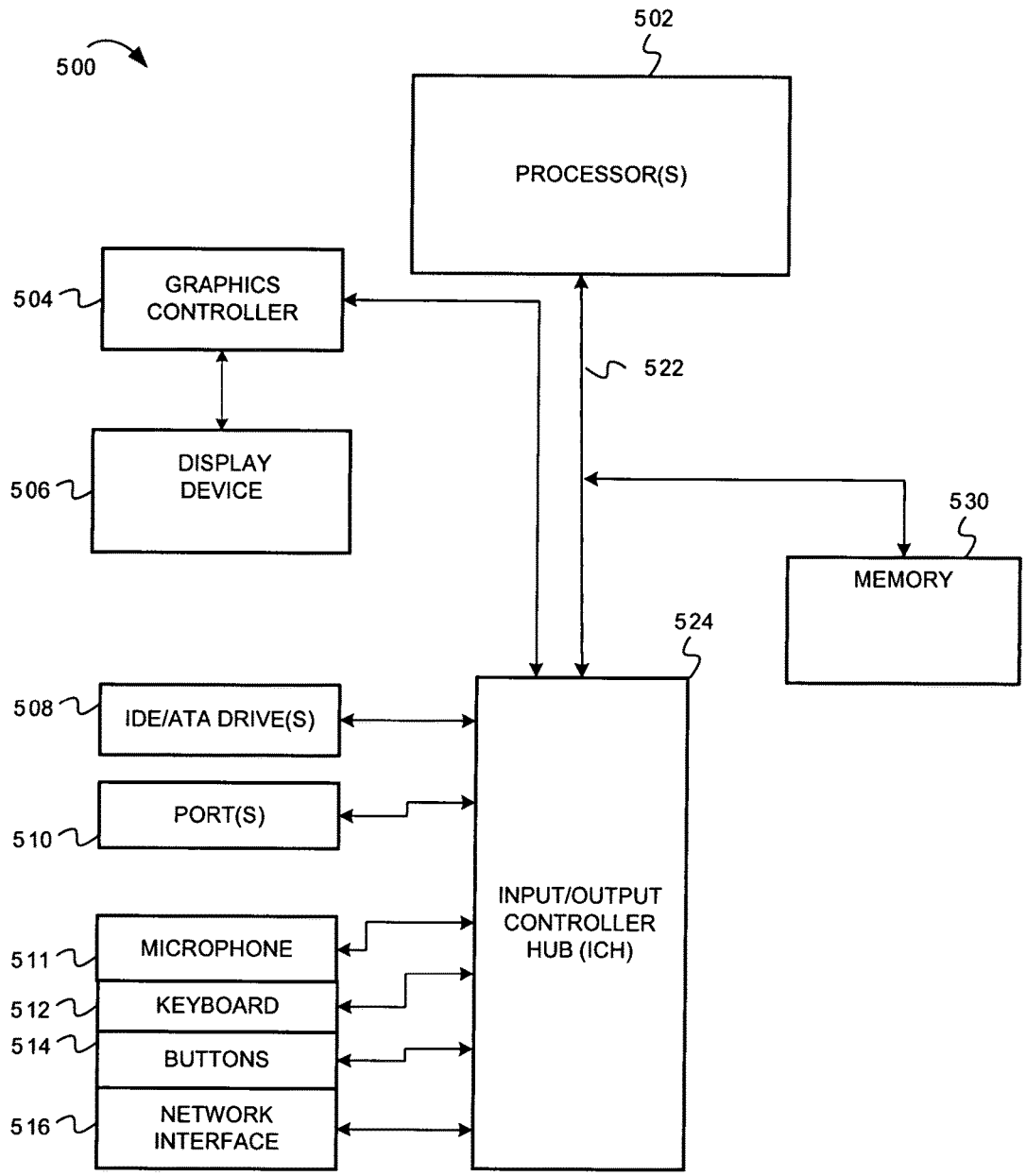
FIG. 5 illustrates a computer that may be used for cryptographic binding of multiple secured connections, according to some embodiments.

A detailed block diagram of an example computer environment, according to some embodiments, is now described. In particular, FIG. 5 illustrates a computer that may be used for cryptographic binding of multiple secured connections, according to some embodiments. A computer system 500 may be representative of the client device 106, the authentication server 108 or one of the web servers 102.

As illustrated in FIG. 5, the computer system 500 comprises processor(s) 502. The computer system 500 also includes a memory unit 530, processor bus 522, and Input/Output controller hub (ICH) 524. The processor(s) 502, memory unit 530, and ICH 524 are coupled to the processor bus 522. The processor(s) 502 may comprise any suitable processor architecture. The computer system 500 may comprise one, two, three, or more processors, any of which may execute a set of instructions in accordance with embodiments of the invention.

The memory unit 530 may store data and/or instructions, and may comprise any suitable memory, such as a dynamic random access memory (DRAM). The computer system 500 also includes IDE drive(s) 508 and/or other suitable storage devices. A graphics controller 504 controls the display of information on a display device 506, according to some embodiments of the invention.

The input/output controller hub (ICH) 524 provides an interface to I/O devices or peripheral components for the computer system 500. The ICH 524 may comprise any suitable interface controller to provide for any suitable communication link to the processor(s) 502, memory unit 530 and/or to any suitable device or component in communication with the ICH 524. For one embodiment of the invention, the ICH 524 provides suitable arbitration and buffering for each interface.

For some embodiments of the invention, the ICH 524 provides an interface to one or more suitable integrated drive electronics (IDE) drives 508, such as a hard disk drive (HDD) or compact disc read only memory (CD ROM) drive, or to suitable universal serial bus (USB) devices through one or more USB ports 510. For one embodiment, the ICH 524 also provides an interface to a keyboard 512, a mouse 514, a CD-ROM drive 518, one or more suitable devices through one or more firewire ports 516. For one embodiment of the invention, the ICH 524 also provides a network interface 520 though which the computer system 500 can communicate with other computers and/or devices.

In some embodiments, the computer system 500 includes a machine-readable medium that stores a set of instructions (e.g., software) embodying any one, or all, of the methodologies for described herein. Furthermore, software may reside, completely or at least partially, within memory unit 530 and/or within the processor(s) 502.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or nonvolatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A non-transitory machine-readable medium including instructions stored thereon which when executed by a machine causes the machine to perform operations comprising:
    performing the following operations as part of login of a user from a client device into a subordinate web service of a single sign-on web service:
    transmitting a request, from the client device, to login into the subordinate web service;
    receive redirection to login to a master web service of the single sign-in web service;
    establishing a first secured connection between the client device and the master web service;
    transmitting user authentication from the client device to the master web service over the first secured connection between the client device and the master web service;
    receiving, by the client device, a Hypertext Transfer Protocol (HTTP) cookie for the single sign-on web service over the first secured connection between the client device and the master web service, in response to the user authentication being authenticated by the master web service; and
    establishing a second secured connection by the client device with the subordinate web service using a cryptographic key in the HTTP cookie for the single sign-on service, wherein the cryptographic key in a single cookie establishes multiple secured connections for different subordinate web services without requiring a public/private key exchange, wherein establishing the second secured connection comprises establishing a Transport Layer Security (TLS) connection with the subordinate web service.

2. The non-transitory machine-readable medium of claim 1, wherein the cryptographic key is used for secured connections with the client device and other subordinate web services of the single sign-on service.

3. The non-transitory machine-readable medium of claim 1, wherein the second secured connection is based on symmetric cryptographic operations using the shared cryptographic key.

4. The non-transitory machine-readable medium of claim 1, wherein the first secured connection is based on asymmetric cryptographic operations.

5. The non-transitory machine-readable medium of claim 1, wherein establishing the second secured connection is without a public key and a private key exchange between the subordinate web service and the client device.

* * * * *